United States Patent
Tomita et al.

(10) Patent No.: US 12,113,210 B2
(45) Date of Patent: Oct. 8, 2024

(54) ELECTRODE FOR ALL-SOLID-STATE BATTERY AND ALL-SOLID-STATE BATTERY

(71) Applicant: Maxell, Ltd., Kyoto (JP)

(72) Inventors: Kentaro Tomita, Kyoto (JP); Naoki Matsuoka, Kyoto (JP); Hiroyoshi Aoki, Kyoto (JP); Haruki Kamizori, Kyoto (JP)

(73) Assignee: MAXELL, LTD., Kyoto (JP)

( * ) Notice: Subject to any disclaimer, the term of this patent is extended or adjusted under 35 U.S.C. 154(b) by 468 days.

(21) Appl. No.: 17/637,158

(22) PCT Filed: Mar. 11, 2021

(86) PCT No.: PCT/JP2021/009739
§ 371 (c)(1),
(2) Date: Feb. 22, 2022

(87) PCT Pub. No.: WO2021/182561
PCT Pub. Date: Sep. 16, 2021

(65) Prior Publication Data
US 2022/0285726 A1   Sep. 8, 2022

(30) Foreign Application Priority Data

Mar. 13, 2020   (JP) ................................ 2020-044829

(51) Int. Cl.
*H01M 4/36*   (2006.01)
*H01M 4/62*   (2006.01)
(Continued)

(52) U.S. Cl.
CPC ........... *H01M 4/366* (2013.01); *H01M 4/628* (2013.01); *H01M 10/0525* (2013.01);
(Continued)

(58) Field of Classification Search
CPC ........................... H01M 4/66; H01M 10/0562
See application file for complete search history.

(56) References Cited

U.S. PATENT DOCUMENTS

| 2015/0340681 A1 | 11/2015 | Iwasaki et al. |
| 2019/0140314 A1 | 5/2019 | Utsuno et al. |

(Continued)

FOREIGN PATENT DOCUMENTS

| EP | 2 874 209 A1 | 5/2015 |
| EP | 3 745 499 A1 | 12/2020 |

(Continued)

OTHER PUBLICATIONS

International Search Report dated May 25, 2021, issued in counterpart International Application No. PCT/JP2021/009739 (2 pages).
(Continued)

*Primary Examiner* — Amanda C. Walke
(74) *Attorney, Agent, or Firm* — WHDA, LLP

(57) ABSTRACT

An all-solid-state battery having excellent load characteristics, and an electrode for an all-solid-state battery for forming the all-solid-state battery are provided. It relates to Goals 12, 3, 7, and 11 of Sustainable Development Goals (SDGs). The electrode for an all-solid-state battery includes a molded body of a mixture containing an active material-containing electrode material, a solid electrolyte, and a conductive assistant. The electrode material is in the form of a composite particle having a layer containing a solid electrolyte A1 or solid electrolyte A2 that contains certain elements on its surface. The mixture molded body includes a solid electrolyte B1 or solid electrolyte B2 that contains certain elements between the composite particles. The compositions of the solid electrolyte A1 and the solid electrolyte B1 satisfy
(Continued)

a certain relationship, or the composition of the solid electrolyte A2 and the composition of the solid electrolyte B2 satisfy a certain relationship.

16 Claims, 2 Drawing Sheets

(51) Int. Cl.
  *H01M 10/0525* (2010.01)
  *H01M 10/0562* (2010.01)
  *H01M 4/02* (2006.01)
  *H01M 4/525* (2010.01)

(52) U.S. Cl.
  CPC .. *H01M 10/0562* (2013.01); *H01M 2004/021* (2013.01); *H01M 2004/028* (2013.01); *H01M 4/525* (2013.01); *H01M 2300/008* (2013.01)

(56) References Cited

U.S. PATENT DOCUMENTS

| | | | |
|---|---|---|---|
| 2019/0198916 A1 | 6/2019 | Yoon et al. | |
| 2020/0350626 A1 | 11/2020 | Matsumura et al. | |
| 2021/0043918 A1 | 2/2021 | Maeyama et al. | |
| 2021/0242490 A1* | 8/2021 | Ku | H01M 4/623 |
| 2024/0006652 A1* | 1/2024 | Moazzen | H01M 4/625 |
| 2024/0097131 A1* | 3/2024 | Sasaki | H01M 4/366 |
| 2024/0136593 A1* | 4/2024 | Koyama | H01M 10/0562 |

FOREIGN PATENT DOCUMENTS

| | | | | |
|---|---|---|---|---|
| JP | 2014-22074 A | 2/2014 | | |
| JP | 2016-207418 A | 12/2016 | | |
| JP | 2017-152147 A | 8/2017 | | |
| JP | 2017-220318 A | 12/2017 | | |
| KR | 20150050321 A | * | 5/2015 | |
| WO | 2019/146236 A1 | 8/2019 | | |
| WO | 2019/150559 A1 | 8/2019 | | |
| WO | WO-2023008006 A1 | * | 2/2023 | ........ H01M 10/0525 |
| WO | WO-2023032473 A1 | * | 3/2023 | .......... H01M 10/052 |
| WO | WO-2023037756 A1 | * | 3/2023 | ........ H01M 10/0525 |
| WO | WO-2023037757 A1 | * | 3/2023 | ........ H01M 10/0525 |

OTHER PUBLICATIONS

Xu Ruochen et al: "Construction of All-Solid-State Batteries based on a Sulfur-Graphene Composite and Li 9.54 Si 1.74 P 1.44 S 11.7 Cl 0.3 Solid Electrolyte", Chemistry—A European Journal, vol. 23, No. 56, Oct. 9, 2017 (Oct. 9, 2017), pp. 13950-13956, XP055959115; Cited in extended European Search Report dated Sep. 19, 2022.
Extended European Search Report dated Sep. 19, 2022, issued in counterpart Ep Application No. 21769022.1.

* cited by examiner

ELECTRODE FOR ALL-SOLID-STATE BATTERY AND ALL-SOLID-STATE BATTERY

TECHNICAL FIELD

The present invention relates to an all-solid-state battery having excellent load characteristics, and an electrode for an all-solid-state battery for forming the all-solid-state battery.

BACKGROUND ART

In recent years, with development of portable electronic devices such as cellular phones and laptop personal computers, or with practical use of electric vehicles, there have been needed compact and lightweight secondary batteries that have a high capacity and a high energy density.

Currently, in lithium secondary batteries or especially lithium-ion secondary batteries, that can meet this demand, a lithium-containing composite oxide such as lithium cobalt oxide ($LiCoO_2$) or lithium nickel oxide ($LiNiO_2$) is used as a positive-electrode active material, graphite or the like is used as a negative-electrode active material, and an organic electrolyte solution containing an organic solvent and a lithium salt is used as a nonaqueous electrolyte.

With further development of devices that use lithium-ion secondary batteries, there have been demanded lithium-ion secondary batteries having a longer life, a higher capacity, and a higher energy density, while satisfying a high degree of safety and reliability of the lithium-ion secondary batteries having the longer life, the higher capacity, and the higher energy density.

However since an organic electrolyte solution used in a lithium-ion secondary battery contains a flammable organic solvent, the organic electrolyte solution might cause generating abnormal heat when an abnormal situation such as a short circuit occurs in the battery. In recent years, as the energy density of lithium-ion secondary batteries and the amount of an organic solvent in the organic electrolyte solution have been increased, there have been further needed safety and reliability of the lithium-ion secondary batteries.

Under these circumstances, all-solid-state lithium secondary batteries (all-solid-state batteries) in which no organic solvents are used have been attracting attention. An all-solid-state battery includes, instead of conventional organic solvent-based electrolytes, a molded body made of a solid electrolyte in which no organic solvents are used, and it is highly safe because there is no risk that the solid electrolyte generates abnormal heat.

All-solid-state batteries are highly safe as well as highly reliable and highly environmentally resistant, and have a long life. Therefore, all-solid-state batteries are expected to become maintenance-free batteries that can contribute to the development of the society as well as to the safety and security. By providing all-solid-state batteries to the society, it can contribute to achievement of Goal 12 (i.e., to ensure sustainable production and consumption patterns), Goal 3 (i.e., to ensure healthy lives and promote well-being for all people of all ages), Goal 7 (i.e., to ensure access for all people to affordable, reliable, sustainable and modern energy) and Goal 11 (i.e., to achieve inclusive, safe, resilient and sustainable cities and human settlements) among the seventeen Sustainable Development Goals (SDGs) established by the United Nations.

Also, various improvements have been attempted in all-solid-state batteries. For example, conventionally, an attempt has been made to improve the performance of all-solid-state batteries by using a complex formed by covering the surface of an electrode active material with a solid electrolyte. Patent Documents 1 and 2 propose techniques to improve the configuration of such a complex and a method for forming such a complex.

CITATION LIST

Patent Documents

Patent Document 1: JP 2014-22074A
Patent Document 2: JP2016-207418A

SUMMARY OF INVENTION

Problem to be Solved by the Invention

Nowadays, the number of fields to which all-solid-state batteries can be applied is rapidly increasing. It is possible that they are used in, for example, applications that require electric discharge at large current values, and therefore, it is necessary to enhance the load characteristics to meet these requirements.

The present invention was invented in light of the aforementioned circumstances, and the object thereof is to provide an all-solid-state battery having excellent load characteristics and an electrode for an all-solid-state battery for forming the all-solid-state battery.

Means for Solving Problem

An electrode for an all-solid-state battery according to a first aspect of the present invention includes a molded body made of a mixture containing an active material-containing electrode material and a solid electrolyte, wherein the electrode material is in the form of a composite particle that includes a layer containing a sulfide-based solid electrolyte A1 on at least a portion of its surface, the mixture molded body includes a sulfide-based solid electrolyte B1 between the composite particles, the solid electrolyte A1 and the solid electrolyte B1 contain elemental phosphorus, elemental sulfur; and a halogen Y including at least one of Cl and Br, and optionally at least one element X selected from the group consisting of Si, Ge, and Sn, and when the sum of molar ratios of the elemental phosphorus and the element X is taken as 1, a molar ratio c of the element X satisfies 0≤c<0.5, and molar ratios of Cl and Br in the Y element contained in the solid electrolyte A1 satisfy a relationship Cl>Br, and molar ratios of Cl and Br in the Y element contained in the solid electrolyte B1 satisfy a relationship Cl≤Br.

An electrode for an all-solid-state battery according to a second aspect of the present invention includes a molded body made of a mixture that contains an active material-containing electrode material and a solid electrolyte, wherein the electrode material is in the form of a composite particle that includes a layer containing a sulfide-based solid electrolyte A2 on at least a portion of its surface, the mixture molded body includes a sulfide-based solid electrolyte B2 between the composite particles, the solid electrolyte A2 and the solid electrolyte B2 contain elemental phosphorus, elemental sulfur, at least one element X selected from the group consisting of Si, Ge, and Sn, and a halogen Y including at least one of Cl and Br, and when the sum of molar ratios of the elemental phosphorus and the element X is taken as 1, a molar ratio c of the element X satisfies c≥0.5, and molar ratios of Cl and Br in the Y element contained in the solid electrolyte A2 satisfy a relationship Cl≤Br, and molar ratios of Cl and Br in the Y element contained in the solid electrolyte B2 satisfy a relationship Cl>Br.

Also, an all-solid-state battery according to the present invention includes a positive electrode; a negative electrode; and a solid electrolyte layer located between the positive electrode and the negative electrode, wherein the electrode for an all-solid-state battery according to the present invention is used as at least one of the positive electrode and the negative electrode.

Effects of the Invention

With the present invention, it is possible to provide an all-solid-state battery having excellent load characteristics and an electrode for an all-solid-state battery for forming the all-solid-state battery.

DISCLOSURE OF INVENTION

Electrode for all-Solid-State Battery

Figure 1:
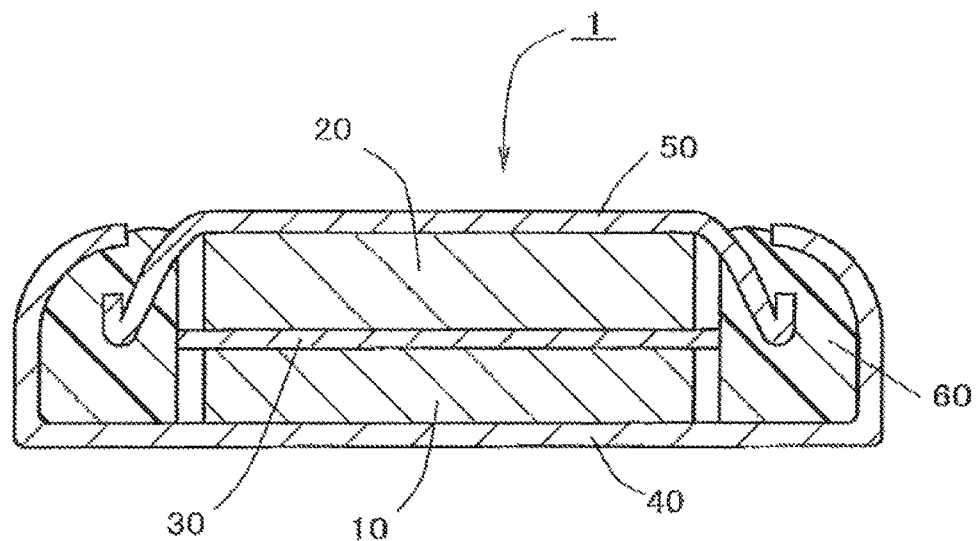
FIG. 1 is a schematic cross-sectional view showing an example of an all-solid-state battery according to the present invention.

An electrode for an all-solid-state battery according to the present invention includes a molded body made of a mixture containing an active material-containing electrode material, a solid electrolyte, and a conductive assistant.

The electrode material to be used in the electrode for an all-solid-state battery according to the first aspect is in a form of a composite particle that includes a layer containing a solid electrolyte A1 on at least a portion of its surface. The mixture molded body included in the electrode for an all-solid-state battery according to the first aspect includes a solid electrolyte B1 between the composite particles. Furthermore, the electrode material to be used in the electrode for an all-solid-state battery according to the second aspect is in a form of a composite particle that includes a layer containing a solid electrolyte A2 on at least a portion of its surface. The mixture molded body included in the electrode for an all-solid-state battery according to the second aspect includes a solid electrolyte B2 between the composite particles.

Both the solid electrolyte A1 and the solid electrolyte B1 contain elemental phosphorus, elemental sulfur and a halogen Y including at least one of Cl and Br. and optionally at least one element X selected from the group consisting of Si, Ge, and Sn.

In both the solid electrolyte A1 and the solid electrolyte B1, when the sum of the molar ratios of the elemental phosphorus and the element X is taken as 1, the molar ratio of the element X satisfies $0 \leq c < 0.5$, the molar ratios of Cl and & in the Y element contained in the solid electrolyte A1 satisfy the relationship Cl>Br, and the molar ratios of Cl and Br in the Y element contained in the solid electrolyte B1 satisfy the relationship Cl≤Br.

On the other hand, both the solid electrolyte A2 and the solid electrolyte B2 contain elemental phosphorus, elemental sulfur, at least one element X selected from the group consisting of Si, Ge, and Sn, and a halogen Y including at least one of Cl and Br.

In both the solid electrolyte A2 and the solid electrolyte B2, when the sum of the molar ratios of the elemental phosphorus and the element X is taken as 1, the molar ratio of the element X satisfies $c \geq 0.5$, the molar ratios of Cl and Br in the Y element contained in the solid electrolyte A2 satisfy the relationship Cl≤Br and the molar ratios of Cl and Br in the Y element contained in the solid electrolyte B2 satisfy the relationship Cl>Br.

Note that the solid electrolyte A1, the solid electrolyte A2, the solid electrolyte B1, and the solid electrolyte B2 do not necessarily contain both Cl and Br in some embodiments.

In the mixture molded body in the electrode for an all-solid-state battery, each of the active material particles needs to come into sufficient contact with the solid electrolyte to improve ion conductivity between the active material particles. Moreover, when a conductive assistant is added to the mixture molded body, for example, to improve the electron conductivity between the active material particles, each of the active material particles needs to come into sufficient contact with the conductive assistant to improve electron conductivity between the active material particles. However, in the configuration in which the active material particles come into favorable contact with both the solid electrolyte and the conductive assistant, the solid electrolyte and the conductive assistant also come into favorable contact with each other. If the solid electrolyte and the conductive assistant come into contact at too many points, the solid electrolyte will be electrochemically decomposed to form an insulator, and therefore, the ion conductivity in the mixture molded body will decrease, thereby leading to, for example, deterioration of load characteristics of a battery. On the other hand, when a conductive active material (e.g., active material having a conductivity of 0.1 to $10^8$ Scm$^{-1}$) is used, a conductive assistant is not necessarily used in some embodiments. At this time, it is desirable that the active material should be in a sufficient contact state. However, in such a case, decomposition of the solid electrolyte occurs at the interface between the active material and the solid electrolyte, or in other words, the solid electrolyte is electrochemically decomposed to form an insulator, and therefore, the ion conductivity in the mixture molded body decreases, thereby leading to, for example, deterioration of load characteristics of a battery.

Accordingly, the solid electrolyte A1 and the solid electrolyte B1, whose compositions differ with each other, or the solid electrolyte A2 and the solid electrolyte B2, whose compositions differ with each other, are used in the electrode for an all-solid-state battery according to the present invention.

The structure of the solid electrolyte containing elemental phosphorus, elemental sulfur, and a halogen Y including at least one of Cl and Br, and optionally at least one element X selected from the group consisting of Si, Ge and Sn is more stable in the case where the amount c of the element X is as small as less than 0.5 (including the case where no element X is contained, that is, c is 0) when the sum of the molar ratios of the elemental phosphorus and the element X is taken as 1, and the amount of Cl is larger than that of Br. Accordingly, the solid electrolyte is unlikely to be decomposed, for example, even when coming into contact with a conductive assistant. When the amount of Cl is smaller than or equal to the amount of Br, the structural stability decreases, but the ion conductivity is enhanced.

On the other hand, the structure of the solid electrolyte containing elemental phosphorus, elemental sulfur, at least one element X selected from the group consisting of Si, Ge and Sn, and a halogen Y including at least one of Cl and Br is more stable in the case where the amount c of the element X is as large as 0.5 or more when the sum of the molar ratios of the elemental phosphorus and the element X is taken as 1, and the amount of Cl is smaller than or equal to the amount of Br. Accordingly, the solid electrolyte is unlikely to be decomposed, for example, even when coming into contact with a conductive assistant. When the amount of Cl is larger than the amount of Br, the structural stability decreases, but the ion conductivity is enhanced.

Therefore, in the present invention, the solid electrolytes containing the above-mentioned elements are classified, based on the amount c of the element X and the relationship between the amount of Cl and the amount of Br, into those having a more stable structure, namely the solid electrolyte A1 and the solid electrolyte A2, and those having a higher ion conductivity, namely the solid electrolyte B1 and the solid electrolyte B2.

The active material-containing electrode material is formed into composite particles in which at least a portion of its surface is covered by a layer containing the solid electrolyte A1 or solid electrolyte A2. Since the solid electrolyte A1 and the solid electrolyte A2 have a more stable structure as mentioned above, covering the active material with a layer containing either of these solid electrolytes makes it possible to suppress a reaction that causes electrochemical decomposition of the solid electrolyte due to contact with the conductive assistant. As a result, the ion conductivity of the layer that covers the surface of the composite particle can be kept high.

On the other hand, the solid electrolyte B1 or solid electrolyte B2 is disposed between the composite particles in the mixture molded body. The ion conductivity of the solid electrolyte B1 is higher than that of the solid electrolyte A1, and the ion conductivity of the solid electrolyte B2 is higher than that of the solid electrolyte A2, thus making it possible to enhance the ion conductivity between the composite particles, thus enhancing the ion conductivity in the mixture molded body.

These functions make it possible to enhance the load characteristics of an all-solid-state battery in which the electrode for an all-solid-state battery according to the present invention is used. Also, even when an active material having a low conductivity is used, for example, in the electrode for an all-solid-state battery according to the present invention, it is possible to enhance the load characteristics as well as the storage characteristics of a battery in which this electrode is used, by adding a conductive assistant in the layer containing the solid electrolyte A1 or solid electrolyte A2 that covers the surface of the active material.

In this specification, the following methods are used to determine the relationship between the molar ratios of the elemental phosphorus and the element X and the relationship between the molar ratios of Cl and Br in the element Y in the solid electrolyte A1 and the solid electrolyte B1, and the relationship between the molar ratios of the elemental phosphorus and the element X and the relationship between the molar ratios of Cl and Br in the element Y in the solid electrolyte A2 and the solid electrolyte B2. A fractured section of an all-solid-state battery is processed to make it have a smooth surface using an ion milling method (using "IM-4000" manufactured by Hitachi High-Tech Corporation) in an environment that is not exposed to the atmosphere, and then the morphological observation of the smooth surface of the obtained sample piece is carried out by using a scanning electron microscope (SEM, "S-4800" manufactured by Hitachi High-Tech Corporation). When this morphological observation is carried out, first, the acceleration voltage is set to 2 kV; and the field of view in which elementary analysis is to be carried out using a secondary electron detector is selected. Then, the acceleration voltage is changed to kV and an elementary mapping image in the same field of view is acquired by using energy dispersive X-ray spectroscopy (EDX) to observe the distribution state of the solid electrolyte A1 and the solid electrolyte B1 or the distribution state of the solid electrolyte A2 and the solid electrolyte B2. At least four portions corresponding to the solid electrolyte A1 and the solid electrolyte B1 or to the solid electrolyte A2 and the solid electrolyte B2 are selected. Then, the elementary analysis is carried out by using EDX in the point analysis mode to determine the element ratio between P (phosphorus) and the element X in each observed portion. Furthermore, the element ratio between Cl and Br when the sum of P and the element X is taken as 1 is determined, and the average value thereof is calculated to obtain the ratio between Cl and Br.

Examples of the electrode for an all-solid-state battery include molded bodies (e.g., pellets) formed by molding a mixture, and those having a structure in which a layer made of a mixture molded body (mixture layer) is formed on a current collector.

When the electrode for an all-solid-state battery serves as a positive electrode, powder of an active material that is used in conventionally known lithium-ion secondary batteries and is capable of occluding and releasing lithium ions can be used as the active material. Specific examples of the positive-electrode active material include spinel-type lithium manganese composite oxides represented by $LiM^1_xMn_{2-x}O_4$ (where $M^1$ is at least one element selected from the group consisting of Li, B, Mg, Ca, Sr, Ba, Ti, V, Cr, Fe, Co, Ni, Cu, Al, Sn, Sb, In, Nb, Mo, W, Y, Ru, and Rh, and x satisfies $0.01 \leq x \leq 0.5$), layered compounds represented by $Li_aMn_{(1-b-a)}Ni_bM^2_cO_{2-d}F_f$ (where $M^2$ is at least one element selected from the group consisting of Co, Mg, Al, B, Ti, V, Cr, Fe, Cu, Zn, Zr, Mo, Sn, Ca, Sr, and W, and a, b, c, d, and f satisfy $0.8 \leq a \leq 1.2$, $0 < b < 0.5$, $0 \leq c \leq 0.5$, $d+f<1$, $-0.1 \leq d \leq 0.2$, and $0 \leq f \leq 0.1$), lithium cobalt composite oxides represented by $LiCo_{1-g}M^3_gO_2$ (where $M^3$ is at least one element selected from the group consisting of Al, Mg, Ti, Zr, Fe, Ni, Cu, Zn, Ga, Ge, Nb. Mo, Sn, Sb, and Ba, and g satisfies $0 \leq g \leq 0.5$), lithium nickel composite oxides represented by $LiNi_{1-h}M^4_hO_2$ (where $M^4$ is at least one element selected from the group consisting of Al, Mg, Ti, Zr, Fe, Co, Cu, Zn, Ga, Ge, Nb, Mo, Sn, Sb, and Ba, and h satisfies $0 \leq h \leq 0.5$), olivine-type composite oxides represented by $LiM^5_{1-m}N_mPO_4$ (where $M^5$ is at least one element selected from the group consisting of Fe, Mn, and Co, N is at least one element selected from the group consisting of Al, Mg, Ti, Zr, Ni, Cu, Zn, Ga, Ge, Nb, Mo, Sn, Sb, and Ba, and m satisfies $0 \leq m \leq 0.5$), and a lithium titanium composite oxide represented by $Li_4Ti_5O_{12}$. These compounds can be used alone or in combination of two or more.

Examples of the conductive positive-electrode active material include $WO_{3-x}$ ($0<x\leq0.5$)(conductivity: $>1$ $Scm^{-1}$), $Li_{1-x}CoO_2$ ($0.05 \leq x \leq 1$) (conductivity: $>1$ $Scm^{-1}$), lithium titanium oxides having a conductivity greater than 0.2 $mScm^{-1}$ such as $Li_4TiO_{12-\delta}$, and niobium oxides having a conductivity greater than 3 $mScm^{-1}$ such as $TiNb_2O_{7-\delta}$.

When the electrode for an all-solid-state battery serves as a negative electrode, there is no particular limitation regarding the active material used in this electrode as long as the active material used is one used in conventionally known lithium-ion secondary batteries and is capable of occluding and releasing lithium ions. For example, one of, or a mixture of two more of carbon materials capable of occluding and releasing lithium such as graphite, pyrolytic carbon, coke, glassy carbon, fired products obtained by firing organic polymer compounds, mesophase carbon microbeads (MCMB), and carbon fibers is used as the negative-electrode active material. An oxide can also be used as the negative-electrode active material, and examples thereof include composite oxides having a monoclinic crystalline structure represented by $Li_xNb_yTiM^6_aO_{\{5y+4/2\}+\delta}$ (where $M^6$ is at least one selected from the group consisting of V, Cr, Mo, Ta, Zr, Mn, Fe, Mg, B, Al, Cu, and Si, and x, y, δ, and a satisfy $0 \leq x \leq 49$, $0.5 \leq y < 24$, $-5 \leq \delta \leq 5$, and $0 \leq a \leq 0.3$), titanium dioxide having an anatase structure, lithium titanate having a ramsdellite structure represented by $Li_2Ti_3O_7$, and spinel-type lithium titanium composite oxide represented by $Li_4Ti_5O_{12}$. These compounds can be used alone or in combination of two or more. Simple substances, compounds, and alloys that include an element such as Si, Sn, Ge, Bi, Sb, or In; compounds that enable charging and discharging at a voltage as low as that in the case of metallic lithium, such as nitrides containing lithium and a transition metal (e.g., Co, Ni, Mn, Fe, Cr, Ti, or W), and lithium-containing oxides; metallic lithium; and lithium-aluminum alloys can also be used as the negative-electrode active material.

The active material can include, on its surface, a reaction suppressing layer for suppressing a reaction between the active material and the solid electrolyte. In particular, when the electrode for an all-solid-state battery serves as a positive electrode, it is preferable that the reaction suppressing layer is provided on the surface of the active material (positive-electrode active material).

It is sufficient that the reaction suppressing layer is made of a material that has ion conductivity and is capable of suppressing a reaction between the active material and the solid electrolyte. Examples of the material capable of forming the reaction suppressing layer include oxides that contain Li and at least one element selected from the group consisting of Nb, P, B, Si, Ge, Ti, and Zr, and specific examples thereof include $LiNbO_3$, $Li_3PO_4$, $Li_3BO_3$, $Li_4SiO_4$, $Li_4GeO_4$, $LiTiO_3$, and $LiZrO_3$. The reaction suppressing layer can contain only one or two or more of these oxides. Furthermore, a plurality of oxides among these oxides can form a composite compound. It is preferable to use $LiNbO_3$ among these oxides.

The thickness of the reaction suppressing layer is preferably 0.1 to 100 nm, and more preferably 1 to 20 nm. Moreover, the ratio (area ratio) of a portion covered by the reaction suppressing layer on the surface of the active material is preferably 40 to 100%.

Examples of the method for forming the reaction suppressing layer on the surface of the active material include a sol-gel method, a mechanofusion method, a CVD method, and a PVD method.

In the electrode for an all-solid-state battery, the active material-containing electrode material is in a form of a composite particle that includes a layer containing the solid electrolyte A1 or a layer containing the solid electrolyte A2 on at least a portion of its surface. In the composite particle, when the active material does not have the reaction suppressing layer, the layer containing the solid electrolyte A1 or the layer containing the solid electrolyte A2 is formed, for example, directly on the surface of the active material, and when the active material has the reaction suppressing layer, the layer containing the solid electrolyte A1 or the layer containing the solid electrolyte A2 is formed, for example, on the surface of the reaction suppressing layer.

The layer containing the solid electrolyte A1 or the layer containing the solid electrolyte A2 included in the composite particle can further contain a conductive assistant in order to, for example, further enhance the electron conductivity between the composite particles. In this case, it is possible to enhance the storage characteristics of a battery. Examples of the conductive assistant contained in the layer include high-crystallinity carbon materials such as graphite (natural graphite and synthetic graphite), graphene (single-layer graphene and multilayer graphene), and carbon nanotubes; and low-crystallinity carbon materials such as carbon black. These materials can be used alone or in combination of two or more.

All of the solid electrolyte A1 and the solid electrolyte A2, which are contained in the composite particles, and the solid electrolyte B1 and the solid electrolyte B2, which are disposed between the composite particles, are preferably made of materials represented by General Formula (1) below.

$$Li_{7-a+b}P_{1-c}X_cS_{6-a}Y_{a+b} \quad (1)$$

In General Formula (1) above, X is Si, Ge, or Sn, Y is a halogen including at least one of Cl and Br, and a, b, and c satisfy $0 \leq b \leq 0.9$, $-3.0a+1.8 \leq b \leq -3.0a+5.7$, and $0 \leq c \leq 1$.

In the solid electrolyte A1 and the solid electrolyte B1 represented by General Formula (1) above, c is preferably smaller than 0.4, and the Cl content in the solid electrolyte A1 is preferably two or more times as large as the Br content, from the viewpoint of enhancing the ion conductivity of the electrode. Similarly in the solid electrolyte A2 and the solid electrolyte B2 represented by General Formula (1) above, c is preferably greater than 0.6, and the Br content in the solid electrolyte A2 is preferably two or more times as large as the Cl content. Moreover, in the solid electrolyte A2 and the solid electrolyte B2 represented by General Formula (1) above, it is preferable that the relationship a<1.2 is satisfied from the viewpoint of improving the structural stability of the solid electrolyte serving as a base.

The solid electrolyte A1, the solid electrolyte A2, the solid electrolyte B1, and the solid electrolyte B2 are more preferably of the argyrodite type because the argyrodite-type electrolyte is chemically stable.

It is possible to determine if the above-mentioned solid electrolytes are of the argyrodite type by extracting a portion of the electrode through focused ion beam (FIB) processing, placing it on a sample stage of a scanning transmission electron microscope, thinning it using an ion beam until the thickness is within a range of 10 nm to 100 nm, and acquiring selected area electron beam diffraction images of portions corresponding to the solid electrolyte A1, the solid electrolyte A2, the solid electrolyte B1, and the solid electrolyte B2.

Solid electrolytes having a composition that differs from those of the solid electrolyte A1, the solid electrolyte A2, the solid electrolyte B1, and the solid electrolyte B2 can also be used as the solid electrolyte contained in the composite particles and the solid electrolyte disposed between the composite particles together with the solid electrolyte A1, the solid electrolyte A2, the solid electrolyte B1, and the solid electrolyte B2. Examples of such solid electrolytes include sulfide-based solid electrolytes, hydride-based solid electrolytes, and oxide-based solid electrolytes that do not contain the halogen Y. Note that, when the solid electrolyte A1 is used, the ratio of the solid electrolyte A1 to the total solid electrolyte used in the composite particles is preferably 45 mass % or more (the solid electrolyte used in the composite particles can also be constituted by the solid electrolyte A1 alone), and when the solid electrolyte A2 is used, the ratio of the solid electrolyte A2 to the total solid electrolyte used in the composite particles is preferably 45 mass % or more (the solid electrolyte used in the composite particles can also be constituted by the solid electrolyte A2 alone). Moreover when the solid electrolyte B1 is used, the ratio of the solid electrolyte B1 to the total solid electrolyte disposed between the composite particles is preferably 45 mass % or more (the solid electrolyte disposed between the composite particles can also be constituted by the solid electrolyte B1 alone), and when the solid electrolyte B2 is used, the ratio of the solid electrolyte B2 to the total solid electrolyte disposed between the composite particles is preferably 45 mass % or more (the solid electrolyte disposed between the composite particles can also be constituted by the solid electrolyte B2 alone).

Examples of the sulfide-based solid electrolytes that do not contain the halogen Y include $Li_2S$—$P_2S_5$-based glass, $Li_2S$—$SiS_2$-based glass, $Li_2S$—$P_2S_5$—$GeS_2$-based glass, and $Li_2S$—$B_2S_3$-based glass. In addition, LGPS-based glass (e.g., $Li_{10}GeP_2S_{12}$), which attracts attention in recent years due to their high lithium-ion conductivity, and the like can also be used.

Examples of the hydride-based solid electrolytes include $LiBH_4$, and solid solutions of $LiBH_4$ and the following alkali metal compound (e.g., solid solutions in which the molar ratio between $LiBH_4$ and the alkali metal compound is 1:1 to 20:1). At least one selected from the group consisting of lithium halides (e.g., LiI, LiBr, LiF, and LiCl), rubidium halides (e.g., RbI, RbBr, RbF, and RbCl), cesium halides (e.g., CsI, CsBr, CsF, and CsCl), lithium amides, rubidium amides, and cesium amides can be used as the alkali metal compound in the above-mentioned solid solution.

Examples of the oxide-based solid electrolytes include $Li_7La_3Zr_2O_{12}$, $LiTi(PO_4)_3$, $LiGe(PO_4)_3$, and $LiLaTiO_3$.

There is no particular limitation regarding the method for forming a layer containing the solid electrolyte A1 or a layer containing the solid electrolyte A2 on the surface of the active material particle, and examples thereof include methods in which the active material particles and the solid electrolyte A1, solid electrolyte A2, or the like are kneaded using a kneading apparatus in which a crushing medium is used (e.g., a planetary ball mill), a planetary centrifugal kneading processor described in Patent Document 1, or a dry kneading apparatus (e.g., "NOB-MINT" (trade name) manufactured by Hosokawa Micron Corporation).

In the layer containing the solid electrolyte A1 included in the composite particle, the content of the solid electrolyte A1 is preferably 1 mass % or more and more preferably 5 mass % or more, and is preferably 20 mass % or less and more preferably 16 mass % or less, from the viewpoint of ensuring the ion conductivity and the electron conductivity with good balance. Similarly, in the layer containing the solid electrolyte A2 included in the composite particle, the content of the solid electrolyte A2 is preferably 1 mass % or more and more preferably 5 mass % or more, and is preferably 20 mass % or less and more preferably 16 mass % or less.

When the layer containing the solid electrolyte A1 included in the composite particle contains a conductive assistant, the content of the conductive assistant is preferably 0.1 mass % or more and more preferably 0.5 mass % or more, and is preferably 5 mass % or less and more preferably 4 mass % or less. Similarly, when the layer containing the solid electrolyte A2 included in the composite particle contains a conductive assistant, the content of the conductive assistant is preferably 0.1 mass % or more and more preferably 0.5 mass % or more, and is preferably 5 mass % or less and more preferably 4 mass % or less.

Both of the thicknesses of the layer containing the solid electrolyte A1 and the layer containing the solid electrolyte A2 are preferably 200 to 5000 nm. Furthermore, both the ratio (area ratio) of a portion covered by the layer containing the solid electrolyte A1 on the surface of the composite particle and the ratio (area ratio) of a portion covered by the layer containing the solid electrolyte A2 on the surface of the composite particle are preferably 30 to 100%.

The mixture molded body in the electrode for an all-solid-state battery optionally contains a binder. In particular, since the sulfide-based solid electrolyte is used as the solid electrolyte B1 and the solid electrolyte B2, the mixture molded body can be favorably formed due to the functions of the sulfide-based solid electrolyte, and therefore, a binder does not have to be used. Various binders (e.g., fluororesins such as polyvinylidene fluoride and polytetrafluoroethylene) that are commonly used in electrodes of lithium-ion secondary batteries can be used as the binder.

The electrode for an all-solid-state battery can contain various conductive assistants listed above as those capable of being used in the layers, in addition to the layer containing the solid electrolyte A1 or the layer containing the solid electrolyte A2 in the composite particle.

The content of carbon atoms (C) in the mixture molded body in the electrode for an all-solid-state battery is preferably 10 mass % or less, and more preferably 5 mass % or less. The carbon atoms in the mixture molded body are derived from the conductive assistant and the binder. When the content of the carbon atoms is small, it is possible to, for example, suppress oxidation of the solid electrolyte that might occur due to the conductive assistant being excessively contained. Note that metal powder and the like can also be used as the conductive assistant for the mixture molded body in addition to the carbon materials listed above as examples. Also, it is possible to choose not to use the conductive assistant depending on the conductivity of the active material or required characteristics. When a carbon material is not used as the conductive assistant and no binders are added, the content of carbon atoms in the mixture molded body is 0 mass %.

The content of carbon atoms in the mixture molded body in this specification can be measured by using the following method (the values described in Examples below were determined by using this method). An electrode section is removed from the all-solid-state battery, and the weight thereof is measured. Next, after the removed sample is impregnated with pure water for 1 hour, the remaining solid matter is collected through filtration, is washed using pure water, and is then dried in a vacuum. The weight of the thus-obtained powder is measured. Furthermore, this powder is impregnated with aqua regia for 1 hour, is filtered, and is then washed by using pure water. The obtained solid matter is impregnated with an aqueous solution of ammonium fluoride for 1 hour, and is filtered. Then, the remaining solid matter is washed by using pure water. The obtained solid matter is dried in a vacuum, and the weight thereof is measured and taken as the content of carbon atoms.

The content of the composite particles in the mixture molded body in the electrode for an all-solid-state battery is preferably 40 to 95 mass %. Both the content of the solid electrolyte B1 and the content of the solid electrolyte B2 in the mixture molded body in the electrode for an all-solid-state battery are preferably 5 to 40 mass %. Furthermore, the content of the Conductive assistant (optionally including a conductive assistant contained in the layer containing the solid electrolyte A1 or the layer containing the solid electrolyte A2, and a conductive assistant contained in addition to the conductive assistant contained in the above-mentioned layers) in the mixture molded body in the electrode for an all-solid-state battery is preferably 0.1 to mass %. When the mixture molded body contains a binder, the content thereof is preferably 5 mass % or less.

When a current collector is used in the electrode for an all-solid-state battery, examples of the current collector include foils, punched metals, nets, expanded metals, and foamed metals that are made of a metal such as aluminum or stainless steel; and carbon sheets.

The electrode for an all-solid-state battery can be manufactured by mixing the composite particles and the solid electrolyte B1 or solid electrolyte B2 and optionally the conductive assistant (other than that used in the composite particles) and the like without using a solvent to prepare a mixture, and molding the mixture into pellets or the like. Also, a positive electrode can be formed by attaching the mixture molded body obtained as described above and the current collector to each other.

Also, the mixture molded body can be formed by mixing the above-mentioned mixture and a solvent to prepare a mixture-containing composition, applying this composition onto a substrate such as the current collector or the solid electrolyte layer to be opposed to the electrode for an all-solid-state battery, and performing pressing processing after drying the composition.

It is preferable to select a solvent that is less likely to deteriorate the solid electrolyte as the solvent used in the mixture-containing composition. In particular, the sulfide-based solid electrolytes and the hydride-based solid electrolytes cause chemical reactions with a minute amount of water, and therefore, it is preferable to use non-polar aprotic solvents such as hydrocarbon solvents including hexane, heptane, octane, nonane, decane, decaline, toluene, and xylene. In particular, it is more preferable to use a super dehydrated solvent in which the water content is reduced to 0.001 mass % (10 ppm) or less. Also, fluorine-based solvents such as "VERTREL (registered trademark)" manufactured by Du Pont-Mitsui Fluorochemicals Co., Ltd., "ZEORORA (registered trademark)" manufactured by Zeon Corporation, and, "NOVEC (registered trademark)" manufactured by Sumitomo 3M Limited, and nonaqueous organic solvents such as dichloromethane and diethyl ether can also be used.

The thickness of the mixture molded body (in both the case where the electrode for an all-solid-state battery does not contain the current collector and the case where the electrode for an all-solid-state battery contains the current collector) is preferably 20 to 2000 µm.

All-Solid-State Battery

An all-solid-state battery according to the present invention is a secondary battery that includes a positive electrode, a negative electrode, and a solid electrolyte layer located between the positive electrode and the negative electrode, and the electrode for an all-solid-state battery according to the present invention is used as at least one of the positive electrode and the negative electrode.

FIG. 1 is a schematic cross-sectional view showing an example of an all-solid-state battery according to the present invention. An all-solid-state battery 1 shown in FIG. 1 has a configuration in which a positive electrode 10, a negative electrode 20, and a solid electrolyte layer 30 located between the positive electrode 10 and the negative electrode 20 are sealed in an outer casing constituted by an outer can 40, a sealing can 50, and a resin gasket 60 located therebetween.

The sealing can 50 is fitted into the opening portion of the outer can 40 via the gasket 60, and the opening portion of the outer can 40 is sealed by fastening the end portion of the opening of the outer can 40 inward, thereby bringing the gasket 60 into contact with the sealing can 50. Thus, a structure in which the inside of an element is hermetically sealed is formed.

An outer can and a sealing can made of stainless steel or the like can be used. Moreover, polypropylene, nylon, or the like can be used as the material of the gasket. In addition, when heat resistance is required in accordance with the application of a battery, fluororesins such as tetrafluoroethylene-perfluoroalkoxyethylene copolymers (PFA), and heat-resistant resins whose melting point is higher than 240° C., such as polyphenylene ether (PPE), polysulfone (PSF), polyarylate (PAR), polyethersulfone (PES), polyphenylene sulfide (PPS), and polyether ether ketone (PEEK), can also be used as a material of the gasket. When a battery is used in an application in which heat resistance is required, a glass hermetic seal can also be used to seal the battery.

Figure 2:
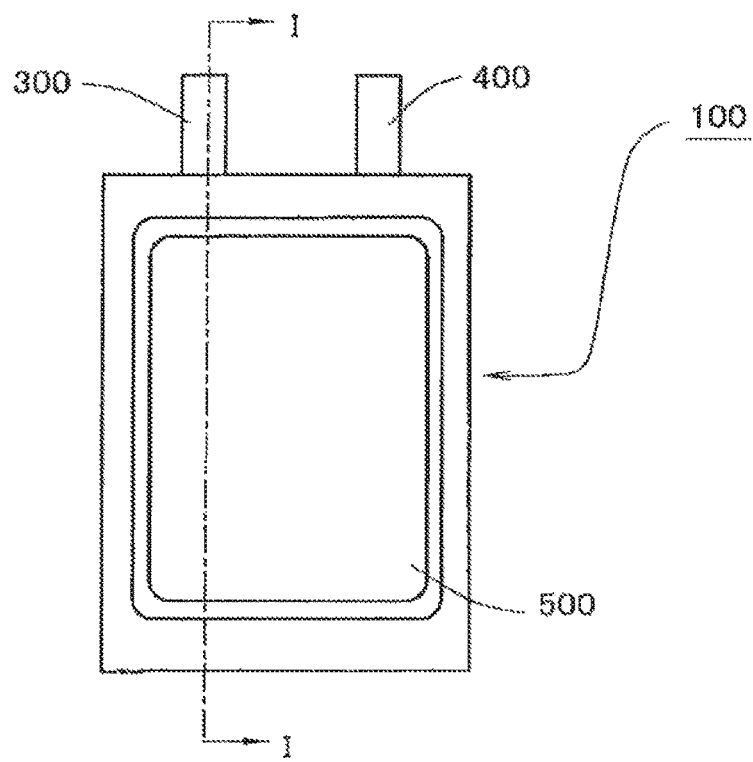
FIG. 2 is a schematic plan view showing another example of the all-solid-state battery according to the present invention.
Figure 3:
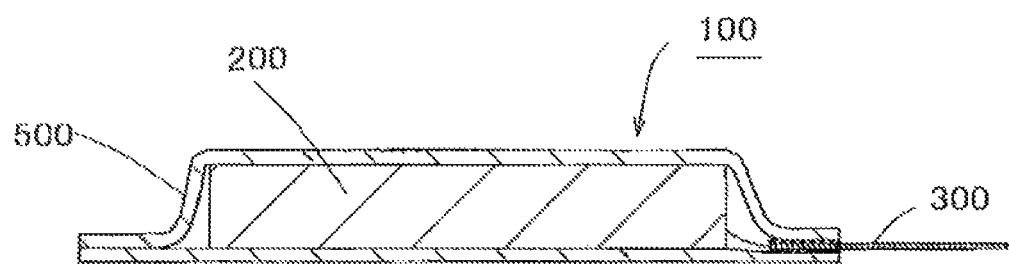
FIG. 3 is a cross-sectional view taken along line I-I in FIG. 2.

FIGS. 2 and 3 are schematic diagrams showing another example of the all-solid-state battery according to the present invention. FIG. 2 is a plan view of the all-solid-state battery, and FIG. 3 is a cross-sectional view taken along line I-I in FIG. 2.

An all-solid-state battery 100 shown in FIGS. 2 and 3 has a configuration in which an electrode body 200 that includes a positive electrode, a solid electrolyte layer, and a negative electrode is housed in a laminate-film outer casing 500 formed by using two metal laminate films, and the laminate-film outer casing 500 is sealed by thermally welding the outer peripheral regions of the upper and lower metal laminate films. Note that the layers included in the laminate-film outer casing 500, and the positive electrode, the negative electrode, and separators included in the electrode body are not distinctively shown in FIG. 3 in order to avoid complication in the figure.

The positive electrode included in the electrode body 200 is connected to a positive electrode external terminal 300 in the battery 100, and the negative electrode included in the electrode body 200 is also connected to a negative electrode external terminal 400 in the battery 100, which is not shown in the drawings. One end of the positive electrode external terminal 300 and one end of the negative electrode external terminal 400 are drawn out of the laminate-film outer casing 500 so as to be capable of being connected to external devices and the like.

Although it is preferable to use the electrode for an all-solid-state battery according to the present invention as the positive electrode of the all-solid-state battery, another electrode (positive electrode) can also be used. An example of the positive electrode other than the electrode for an all-solid-state battery according to the present invention is an electrode (positive electrode) having the same configuration as that of the electrode for an all-solid-state battery according to the present invention except that a positive-electrode active material that can be used in the composite particles is used instead of the composite particles.

Although it is possible to use the electrode for an all-solid-state battery according to the present invention as the negative electrode of the all-solid-state battery, another electrode (negative electrode) can also be used. Examples of the negative electrode other than the electrode for an all-solid-state battery according to the present invention include an electrode (negative electrode) having the same configuration as that of the electrode for an al-solid-state battery according to the present invention except that a negative-electrode active material that can be used in the composite particles is used instead of the composite particles; and a negative electrode constituted by a single foil made of one of various alloys and metallic lithium serving as a negative-electrode active material or formed by layering the foil on the current collector as an active material layer.

In the solid electrolyte layer for the all-solid-state battery, it is possible to use one or two or more of the same solid electrolytes as the various solid electrolytes such as the sulfide-based solid electrolytes (solid electrolytes that can correspond to the solid electrolyte A1, the solid electrolyte A2, the solid electrolyte B1, or the solid electrolyte B2, such as those represented by General Formula (1) above, or solid electrolytes that cannot correspond to the solid electrolyte A1, the solid electrolyte A2, the solid electrolyte B1, or the solid electrolyte B2, such as sulfide-based solid electrolytes containing no halogen Y), the hydride-based solid electrolytes, and the oxide-based solid electrolytes listed above as the solid electrolyte in the electrode for an all-solid-state battery. However, it is preferable that a sulfide-based solid electrolyte should be contained in order to further improve the battery characteristics.

The solid electrolyte layer can be formed by using a method in which a solid electrolyte is compressed through compression molding or the like; a method in which a composition for forming a solid electrolyte layer that is prepared by dispersing a solid electrolyte in a solvent is applied to a substrate, the positive electrode, or the negative electrode and is then dried, and a compression molding process such as pressing processing is optionally performed; and the like.

The solid electrolyte layer can include, as a support, a porous material such as nonwoven fabric made of a resin.

In the same manner as the mixture-containing composition used to manufacture the electrode for an all-solid-state battery, it is desirable to select a solvent that is less likely to deteriorate the solid electrolyte as the solvent used in the composition for forming a solid electrolyte layer. It is preferable to use the various solvents listed above as the solvents for the mixture-containing composition. It is particularly preferable to use a super dehydrated solvent in which the water content is reduced to 0.001 mass % (10 ppm) or less.

The thickness of the solid electrolyte layer is preferably 10 to 400 μm.

The positive electrode and the negative electrode can be used for a battery in the form of a layered electrode body obtained by layering these electrodes with the solid electrolyte layer being located therebetween or in the form of a wound electrode body obtained by winding the above-mentioned layered electrode body.

Note that it is preferable to form the electrode body by performing compression molding in the state in which the positive electrode, the negative electrode, and the solid electrolyte layer are layered from the viewpoint of enhancing the mechanical strength of the electrode body. Also, the positive electrode (e.g., a pellet-like molded body made of a positive-electrode mixture), the solid electrolyte layer, and the negative electrode (e.g., a pellet-like molded body made of a negative-electrode mixture) can be integrated through the compression molding. In this case, for example, an electrode body in which a positive electrode, a solid electrolyte layer, and a negative electrode are integrated can be formed by molding a positive-electrode mixture (or negative-electrode mixture), forming a solid electrolyte layer on the formed molded body made of the positive-electrode mixture, and forming a molded body made of the negative-electrode mixture (or molded body made of the positive-electrode mixture) on the formed solid electrolyte layer.

EXAMPLES

Hereinafter the present invention will be described in detail based on examples. However, the present invention is not limited to the following examples.

Example 1

Preparation of Positive-Electrode Active Material

First, 0.86 g of lithium and 38.7 g of pentaethoxy niobium were mixed in 394 g of dehydrated ethanol to prepare a coating solution for forming a reaction suppressing layer. Next, the coating solution for forming a reaction suppressing layer was applied onto 1000 g of a positive-electrode active material (LiCoO$_2$) at a speed of 2 g/minute using a coating apparatus equipped with a rolling fluidized bed. Heat treatment was performed on the obtained powder at 350° C. to obtain an active material in which a reaction suppressing layer having an average thickness of 7 nm and containing LiNbO$_3$ was formed on the surface.

Preparation of Solid Electrolyte

Lithium sulfide, diphosphorus pentasulfide, lithium chloride, and lithium bromide were mixed in an agate mortar in an argon atmosphere in a glove box for 1 hour. Next, 4 ml of the mixture obtained above was placed in a closed vessel made of zirconia having an internal volume of 12 ml, then a 4-ml zirconia ball was further placed therein, and the mixture was kneaded at 380 rpm for 20 hours.

The mixture obtained above was molded into pellets with a force of 2000 kgf using a mold having a diameter of 10 mm. The pellets were placed in a melting pot made of glassy carbon and were fired in an argon atmosphere at 550° C. for 7 hours. The pellets obtained above were crushed in an agate mortar for 20 minutes. Dehydrated xylene was added to the powder obtained above, and the mixture obtained was processed into minute particles using a bead mill for 3 hours and was then dried by heating in a vacuum at 120° C. to obtain particles of a sulfide-based solid electrolyte (1) (Li$_{5.4}$PS$_{4.4}$Cl$_{0.8}$Br$_{0.8}$) having an argyrodite-type structure (having an average particle diameter (D$_{50}$) of 1.1 μm).

Formation of Solid Electrolyte Layer 80 mg of the sulfide-based solid electrolyte (1) prepared as mentioned above was placed in a powder molding mold having a diameter of 10 mm and was molded with a pressure of 4000 kgf/cm$^2$ using a pressing machine to form a solid electrolyte layer.

Formation of Composite Particle

The positive-electrode active material having, on the surface, the reaction suppressing layer produced as mentioned above, a sulfide-based solid electrolyte (2) (Li$_{5.8}$PS$_{4.6}$Cl$_{1.6}$) having an average particle diameter (D$_{50}$) of 0.8 μm and having an argyrodite-type structure, and vapor grown carbon fibers (conductive assistant) were dry-blended at a mass ratio of 82.4:1.6:16 using a planetary centrifugal mixer. The mixture obtained above was placed in a closed vessel made of zirconia having an internal volume of 12 ml, then a 4-ml zirconia ball was placed therein, and the mixture was kneaded at 100 rpm for 2 hours using a planetary ball mill to form composite particles. The sulfide-based solid electrolyte (2) used to form the composite particles corresponds to the solid electrolyte A1.

Production of Positive Electrode

The composite particles and the sulfide-based solid electrolyte (1) prepared as mentioned above were weighed at a mass ratio of 85:15 and were dry-blended by using a planetary centrifugal mixer to prepare a positive-electrode mixture. Next, 15 mg of the positive-electrode mixture was placed on the solid electrolyte layer in the powder molding mold and was molded with a pressure of 4000 kgf/cm$^2$ by using a pressing machine to form a positive electrode constituted by a cylindrical molded body made of the positive-electrode mixture on the solid electrolyte layer. At this time, the content of carbon atoms in the molded body made of the positive-electrode mixture was 1.5 mass %. The sulfide-based solid electrolyte (1) used to form the molded body made of the positive-electrode mixture corresponds to the solid electrolyte B1.

Formation of Layered Electrode Body

An electrode formed by attaching a cylindrical molded body made of U metal and a cylindrical molded body made of In metal to each other was used as a negative electrode. This negative electrode was placed on a surface of the solid electrolyte layer in the powder molding mold on a side opposite to the positive electrode, and compression molding was performed by using a pressing machine to form a layered electrode body.

Assembly of All-Solid-State Battery

The above-mentioned layered electrode body was used to produce an all-solid-state battery having the same planar structure as that shown in FIG. 2. A positive-electrode current collecting foil (SUS foil) and a negative-electrode current collecting foil (SUS foil) were attached to a surface of an aluminum laminate film included in a laminate-film outer casing on the interior side of the outer casing so as to be adjacent to each other with a certain interval being provided therebetween. The current collecting foils cut out into a shape provided with a main body portion to be opposed to a surface on the positive electrode side or the negative electrode side of the layered electrode body, and a positive electrode external terminal 300 and a negative electrode external terminal 400 that protrude from the main body portion toward the outside of the battery were used.

An all-solid-state battery was obtained by placing the layered electrode body on the negative-electrode current collecting foil of the laminate-film outer casing, covering the layered electrode body by the laminate-film outer casing such that the positive-electrode current collecting foil was disposed on the positive electrode of the layered electrode body, and thermally welding the remaining three sides of the laminate-film outer casing under vacuum to seal the laminate-film outer casing.

Example 2

An all-solid-state battery was produced in the same manner as in Example 1, except that the molding pressure was changed to 6000 kgf/cm$^2$.

Example 3

The same composite particles as those in Example 1, the same sulfide-based solid electrolyte (1) as that prepared in Example 1, and vapor grown carbon fibers (conductive assistant) were weighed at a mass ratio of 85:13.5:1.5 and were dry-blended by using a planetary centrifugal mixer to prepare a positive-electrode mixture. At this time, the content of carbon atoms in the molded body made of the positive-electrode mixture was 3.0 mass %. A positive electrode was produced by using this positive-electrode mixture in the same manner as in Example 1. Then, an all-solid-state battery was produced in the same manner as in Example 1, except that this positive electrode was used.

Example 4

A positive electrode was produced in the same manner as in Example 1, except that the composition of the composite particles was changed such that the mass ratio between the positive-electrode active material and the solid electrolyte A1 was 82.4:17.6, and a portion of the solid electrolyte B1 was changed to vapor grown carbon fibers such that the content of carbon atoms in the molded body made of the positive-electrode mixture was 1.5%. Then, an all-solid-state battery was produced in the same manner as in Example 1, except that this positive electrode was used.

Example 5

An all-solid-state battery was produced in the same manner as in Example 1, except that the positive electrode molding pressure was changed to 6000 kgf/cm$^2$, and the negative electrode was changed to a molded body obtained by molding, with a pressure of 6000 kgf/cm$^2$, 23 mg of a mixture containing $Li_4Ti_5O_{12}$, the same sulfide-based solid electrolyte (1) as that prepared in Example 1, and vapor grown carbon fibers at a mass ratio of 50:41:9.

Comparative Example 1

A positive electrode was produced in the same manner as in Example 1, except that the solid electrolyte A1 was changed to the same sulfide-based solid electrolyte (1) as that prepared in Example 1, and the solid electrolyte B1 was changed to the sulfide-based solid electrolyte (2) ($Li_{5.8}PS_{4.6}Cl_{1.6}$). Then, an all-solid-state battery was produced in the same manner as in Example 1, except that this positive electrode was used.

Comparative Example 2

A positive electrode was produced in the same manner as in Example 1, except that the solid electrolyte A1 was changed to the same sulfide-based solid electrolyte (1) as that prepared in Example 1. Then, an all-solid-state battery was produced in the same manner as in Example 1, except that this positive electrode was used.

Comparative Example 3

An all-solid-state battery was produced in the same manner as in Comparative Example 2, except that the molding pressure was changed to 6000 kgf/cm$^2$.

Comparative Example 4

An all-solid-state battery was produced in the same manner as in Example 1, except that the positive electrode was changed to a molded body obtained by molding, with a pressure of 4000 kgf/cm$^2$, 15 mg of a mixture containing $LiCoO_2$, the same sulfide-based solid electrolyte (1) as that prepared in Example 1, and vapor grown carbon fibers at a mass ratio of 70:28.5:1.5, and this positive electrode was used.

Comparative Example 5

An all-solid-state battery was produced in the same manner as in Example 1, except that the positive electrode was changed to a molded body obtained by molding, with a pressure of 6000 kgf/cm², 15 mg of a mixture containing LiCoO₂, Li₅.₈PS₄.₆Cl₁.₆, and vapor grown carbon fibers at a mass ratio of 70:28.5:1.5, and the negative electrode was changed to a molded body obtained by molding, with a pressure of 6000 kgf/cm², 23 mg of a mixture containing Li₄Ti₅O₁₂, the same sulfide-based solid electrolyte (1) as that prepared in Example 1, and vapor grown carbon fibers at a mass ratio of 50:41:9.

Comparative Example 6

An all-solid-state battery was produced in the same manner as in Example 1, except that the positive electrode was changed to a molded body obtained by molding, with a pressure of 6000 kgf/cm², 15 mg of a mixture containing LiCoO₂, the same sulfide-based solid electrolyte (1) as that prepared in Example 1, and vapor grown carbon fibers at a mass ratio of 70:28.5:1.5, and the negative electrode was changed to a molded body obtained by molding, with a pressure of 6000 kgf/cm², 23 mg of a mixture containing Li₄Ti₅O₁₂, the same sulfide-based solid electrolyte (1) as that prepared in Example 1, and vapor grown carbon fibers at a mass ratio of 50:41:9.

The all-solid-state batteries of the examples and the comparative examples were evaluated as follows.
Evaluation of Storage Characteristics Each of the all-solid-state batteries of the examples and the comparative examples was charged with a constant current at a current value of 0.05 C to reach a voltage of 3.68V, was subsequently charged with a constant voltage until the current value reached 0.01 C, and was then discharged at a current value of 0.02 C until the voltage reached 1.88 V. Then, the initial capacity was measured.

After the initial capacity had been measured, each of the batteries was charged under the same conditions as measuring the initial capacity, and was then stored at 60° C. for 5 days. The temperature of the battery was brought back to room temperature, and then the battery was discharged under the same conditions as measuring the initial capacity. Furthermore, after discharging, each of the batteries was charged and discharged under the same conditions as measuring the initial capacity, and the recovered capacity was determined. The recovered capacity maintenance ratio of each battery was determined by dividing the recovered capacity by the initial capacity and representing the obtained value in percentage, and thus the storage characteristics were evaluated.
Evaluation of Load Characteristics After the storage characteristics were evaluated, each of the batteries was charged and discharged under the same conditions as measuring the initial capacity except that the current value during discharge was changed to 0.2 C. Thus, the 0.2-C discharged capacity was measured. The capacity ratio of each battery was determined by dividing the 0.2-C discharged capacity by the recovered capacity (0.02-C discharge capacity) and representing the obtained value in percentage, and thus the load characteristics of the battery were evaluated.

Table 1 shows the configurations of the positive electrodes according to the all-solid-state batteries of Examples 1 to 4 and Comparative Examples 1 to 4 in which the negative electrodes obtained by attaching Li metal and In metal to each other were used, and Table 2 shows the evaluation results. Note that "Relationship between compositional ratios of Y" shown in Table 1 means the relationship between the compositional ratios of the elements Y in the solid electrolyte, the values in the "Composite particles" column each refer to the relationship between the compositional ratios of Y in the solid electrolyte used in the layer containing the solid electrolyte in the composite particles, the values in the "Between composite particles" column each refer to the relationship between the compositional ratios of Y in the solid electrolyte disposed between the composite particles (i.e., solid electrolyte used to form the molded body made of the positive-electrode mixture), "Yes" in the "Composite particles" of the "Conductive assistant addition position" column means that the layer on the surface of the composite particle contained the conductive assistant, and "Yes" in the "Between composite particles" means that the conductive assistant was disposed between the composite particles (the same applies to Table 3 later).

TABLE 1

| | Relationship between compositional ratios of Y | | Conductive assistant addition position | |
|---|---|---|---|---|
| | Composite particles | Between composite particles | Composite particles | Between composite particles |
| Ex. 1 | Cl > Br | Cl ≤ Br | Yes | |
| Ex. 2 | Cl > Br | Cl ≤ Br | Yes | |
| Ex. 3 | Cl > Br | Cl ≤ Br | Yes | Yes |
| Ex. 4 | Cl > Br | Cl ≤ Br | | Yes |
| Comp. Ex. 1 | Cl ≤ Br | Cl > Br | Yes | |
| Comp. Ex. 2 | Cl ≤ Br | Cl ≤ Br | Yes | |
| Comp. Ex. 3 | Cl ≤ Br | Cl ≤ Br | Yes | |
| Comp. Ex. 4 | — | Cl ≤ Br | | Yes |

TABLE 2

| | Storage characteristics Recovered capacity maintenance ratio (%) | Load characteristics 0.2 C/0.02 C capacity ratio (%) |
|---|---|---|
| Ex. 1 | 97.7 | 92.1 |
| Ex. 2 | 95.5 | 92.2 |
| Ex. 3 | 94.6 | 95.7 |
| Ex. 4 | 77.3 | 91.1 |
| Comp. Ex. 1 | 68.6 | 90.6 |
| Comp. Ex. 2 | 87.4 | 89.5 |
| Comp. Ex. 3 | 94.4 | 90.7 |
| Comp. Ex. 4 | 74.9 | 90.9 |

As shown in Tables 1 and 2, the all-solid-state batteries of Examples 1 to 4 each having the positive electrode in which the compositions of the solid electrolyte A1 in the surface layers of the composite particles and the solid electrolyte B1 disposed between the composite particles satisfied the appropriate relationship had a high 0.2 C/0.02 C capacity ratio in the evaluation of the load characteristics, and thus had excellent load characteristics. Also, the batteries of Examples 1 to 3 each having the positive electrode in which the composite particles whose surface layers contained the conductive assistant were used had a higher recovered capacity maintenance ratio in the evaluation of the storage characteristics and thus had better storage characteristics, compared with the battery of Example 4 having the positive electrode in which the composite particles whose surface layers did not contain the conductive assistant were used.

In contrast, the all-solid-state batteries of Comparative Examples 1 to 3 each having the positive electrode in which the relationship between the composition of the solid electrolyte contained in the surface layers of the composite particles and the composition of the solid electrolyte disposed between the composite particles was inappropriate, and the battery of Comparative Example 4 having the positive electrode in which LiCoO$_2$ was used as it is instead of the composite particles had a low 0.2 C/0.02 C capacity ratio in the evaluation of the load characteristics.

Table 3 shows the configurations of the positive electrodes of the all-solid-state batteries of Example 5 and Comparative Examples 5 and 6 in which the negative electrodes containing Li$_4$Ti$_5$O$_{12}$ were used, and Table 4 shows the evaluation results.

TABLE 3

| | Relationship between compositional ratios of Y | | Conductive assistant addition position | |
| --- | --- | --- | --- | --- |
| | Composite particles | Between composite particles | Composite particles | Between composite particles |
| Ex. 5 | Cl > Br | Cl ≤ Br | Yes | |
| Comp. Ex. 5 | | Cl > Br | | Yes |
| Comp. Ex. 6 | | Cl ≤ Br | | Yes |

TABLE 4

| | Storage characteristics Recovered capacity maintenance ratio (%) | Load characteristics 0.2 C/0.02 C capacity ratio (%) |
| --- | --- | --- |
| Ex. 5 | 95.7 | 77.4 |
| Comp. Ex. 5 | 93.9 | 70.8 |
| Comp. Ex. 6 | 89.1 | 69.9 |

As shown in Tables 3 and 4, the all-solid-state battery of Example 5 having the positive electrode in which the compositions of the solid electrolyte A1 in the surface layers of the composite particles and the solid electrolyte B1 disposed between the composite particles satisfied the appropriate relationship, had a high 0.2 C/0.02 C capacity ratio in the evaluation of the load characteristics, and thus had excellent load characteristics.

In contrast, the batteries of Comparative Examples 5 and 6 each having the positive electrode in which LiCoO$_2$ was used as it is instead of the composite particles had a low 0.2 C/0.02 C capacity ratio in the evaluation of the load characteristics.

The battery of Example 5had a higher recovered capacity maintenance ratio in the evaluation of the storage characteristics compared with the batteries of Comparative Examples 5 and 6, and the storage characteristics thereof were better than those of the batteries of Comparative Examples 5 and 6.

The present invention can be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The all-solid-state battery according to the present invention can be applied to the same applications as those of conventionally known secondary batteries. However, since the all-solid-state battery according to the present invention includes a solid electrolyte instead of an organic electrolyte solution, it has excellent heat resistance and can thus be favorably used in applications that are exposed to high temperatures. The electrode for an all-solid-state battery according to the present invention can be used in the all-solid-state battery according to the present invention.

LIST OF REFERENCE NUMERALS 1, 100 All-solid-state battery
10 Positive electrode
20 Negative electrode
30 Solid electrolyte layer
40 Outer can
50 Sealing can
60 Gasket
200 Electrode body
300 Positive electrode external terminal
400 Negative electrode external terminal
500 Laminate-film outer casing

The invention claimed is:

1. An electrode for an all-solid-state battery to be used in an all-solid-state battery, the electrode comprising
a molded body made of a mixture that contains an active material-containing electrode material and a solid electrolyte,
wherein the electrode material is in the form of a composite particle that includes a layer containing a sulfide-based solid electrolyte A1 on at least a portion of its surface,
the mixture molded body includes a sulfide-based solid electrolyte B1 between the composite particles,
the solid electrolyte A1 and the solid electrolyte B1 contain elemental phosphorus, elemental sulfur, and a halogen Y including at least one of Cl and Br, and optionally at least one element X selected from the group consisting of Si, Ge, and Sn, and when the sum of molar ratios of the elemental phosphorus and the element X is taken as 1, a molar ratio c of the element X satisfies 0≤c<0.5, and
molar ratios of Cl and Br in the Y element contained in the solid electrolyte A1 satisfy a relationship Cl>Br, and molar ratios of Cl and Br in the Y element contained in the solid electrolyte B1 satisfy a relationship Cl≤Br.

2. The electrode for an all-solid-state battery according to claim 1,
wherein the solid electrolyte A1 and the solid electrolyte B1 are represented by General Formula (1):

$$Li_{7-a+b}P_{1-c}X_cS_{6-a}Y_{a+b} \quad (1)$$

where X is Si, Ge, or Sn, Y is a halogen including at least one of Cl and Br, and a, b, and e satisfy 0≤b≤0.9, −3.0a+ 1.8≤b≤−3.0a+5.7, and 0≤c≤1.

3. The electrode for an all-solid-state battery according to claim 1,
wherein the solid electrolyte A1 and the solid electrolyte B1 are of an argyrodite type.

4. The electrode for an all-solid-state battery according to claim 1,
wherein the layer containing the solid electrolyte A1 in the electrode material further contains a conductive assistant.

5. The electrode for an all-solid-state battery according to claim 1,
wherein the molded body is formed on a current collector.

6. The electrode for an all-solid-state battery according to claim 1, wherein the electrode material includes a reaction suppressing layer for suppressing a reaction between the active material and the solid electrolyte on at least a portion of a surface of the active material.

7. The electrode for an all-solid-state battery according to claim 1,
wherein the mixture molded body further contains a conductive assistant.

8. An electrode for an all-solid-state battery to be used in an all-solid-state battery, the electrode comprising
a molded body made of a mixture that contains an active material-containing electrode material and a solid electrolyte,
wherein the electrode material is in the form of a composite particle that includes a layer containing a sulfide-based solid electrolyte A2 on at least a portion of its surface,
the mixture molded body includes a sulfide-based solid electrolyte B2 between the composite particles,
the solid electrolyte A2 and the solid electrolyte B2 contain elemental phosphorus, elemental sulfur, at least one element X selected from the group consisting of Si, Ge, and Su, and a halogen Y including at least one of Cl and Br, and when the sum of molar ratios of the elemental phosphorus and the element X is taken as 1, a molar ratio c of the element X satisfies $c \geq 0.5$, and
molar ratios of Cl and Br in the Y element contained in the solid electrolyte A2 satisfy a relationship $Cl \leq Br$, and molar ratios of Cl and Br in the Y element contained in the solid electrolyte B2 satisfy a relationship $Cl > Br$.

9. The electrode for an all-solid-state battery according to claim 8,
wherein the solid electrolyte A2 and the solid electrolyte B2 are represented by General Formula (1):

$$Li_{7-a+b}P_{1-c}X_cS_{6-a}Y_{a+b} \quad (1)$$

where X is Si, Ge, or Sn, Y is a halogen including at least one of Cl and Br, and a, b, and c satisfy $0 \leq b \leq 0.9$, $-3.0a+1.8 \leq b \leq -3.0a+5.7$, and $0 \leq c \leq 1$.

10. The electrode for an all-solid-state battery according to claim 8,
wherein the solid electrolyte A2 and the solid electrolyte B2 are of an argyrodite type.

11. The electrode for an all-solid-state battery according to claim 8,
wherein the layer containing the solid electrolyte A2 in the electrode material further contains a conductive assistant.

12. The electrode for an all-solid-state battery according to claim 8,
wherein the molded body is formed on a current collector.

13. The electrode for an all-solid-state battery according to claim 8,
wherein the electrode material includes a reaction suppressing layer for suppressing a reaction between the active material and the solid electrolyte on at least a portion of a surface of the active material.

14. The electrode for an all-solid-state battery according to claim 8,
wherein the mixture molded body further contains a conductive assistant.

15. An all-solid-state battery comprising:
a positive electrode;
a negative electrode; and
a solid electrolyte layer located between the positive electrode and the negative electrode,
wherein the electrode for an all-solid-state battery according to claim 1 is used as at least one of the positive electrode and the negative electrode.

16. An all-solid-state battery comprising:
a positive electrode;
a negative electrode; and
a solid electrolyte layer located between the positive electrode and the negative electrode,
wherein the electrode for an all-solid-state battery according to claim 8 is used as at least one of the positive electrode and the negative electrode.

* * * * *